April 23, 1935.  H. B. SHAPIRO  1,999,133
FILM EXHIBITOR
Filed Aug. 31, 1934
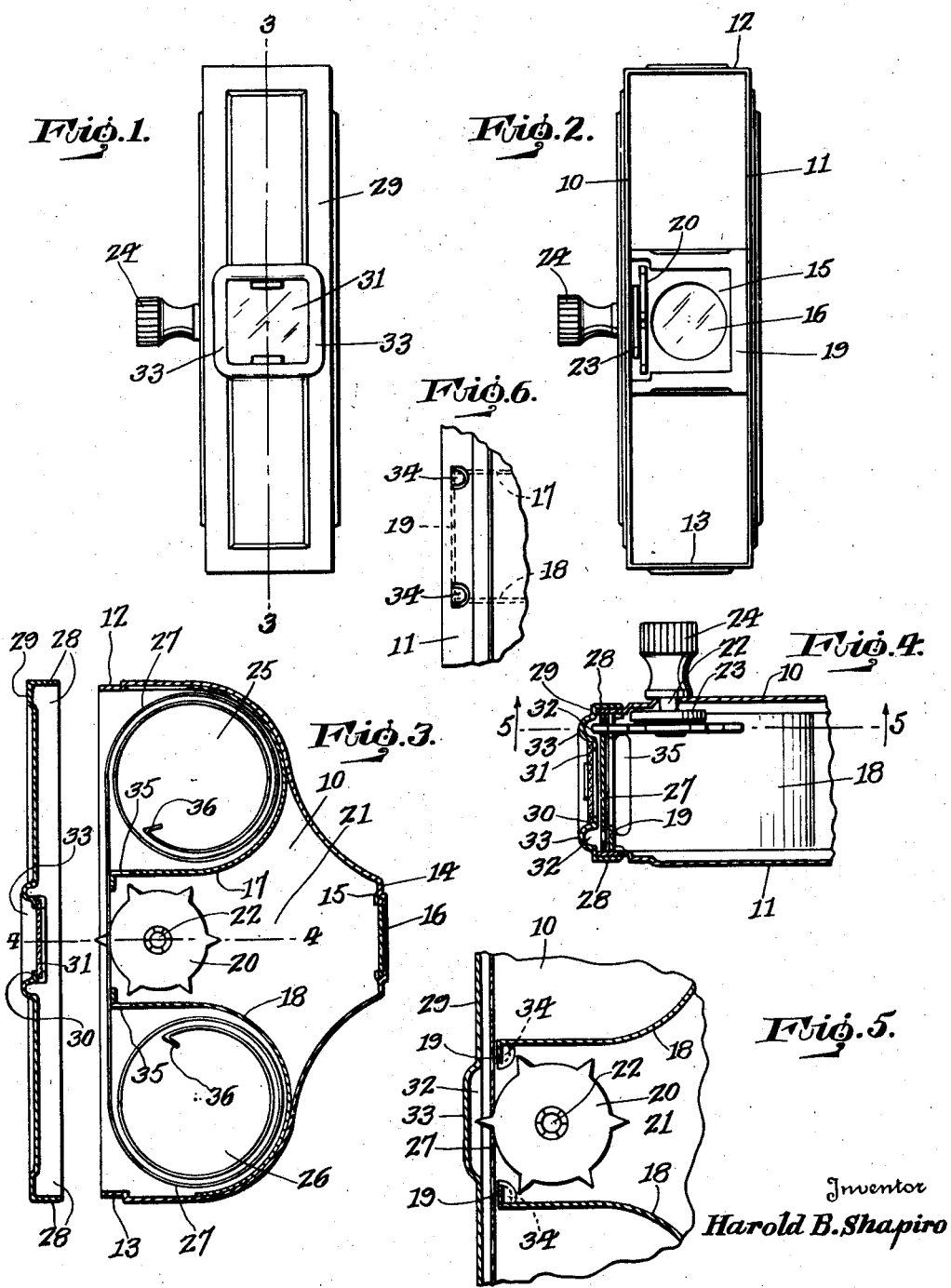

Patented Apr. 23, 1935

1,999,133

UNITED STATES PATENT OFFICE 1,999,133

FILM EXHIBITOR

Harold B. Shapiro, Chicago, Ill., assignor to Allied Manufacturing Company, a corporation of Illinois Application August 31, 1934, Serial No. 742,317

5 Claims. (Cl. 40—86)

My present invention relates to devices for the direct viewing of scenic or other picture films, and of the general nature including a box having therein a dark view chamber in which the film is seen through a lens, and through which the film is moved across a window opposite the lens, the film being housed in roll chambers above and below the view chamber, from each of which latter chambers the film may either roll or unroll, as shown, for instance, in Patent 1,957,378 granted to Harry Zimmerman under date of May 1, 1934.

Although relating in general to a similar type of device as that included in my above patent, my present application involves a considerably varied construction, and has for its object the provision of a stronger, more practical, more easily adjustable and operating construction and arrangement of parts which will plainly appear in the course of the following description and by reference to the accompanying drawing, which forms a part of this specification, and in which, Figure 1 is a front elevation of the complete device, Figure 2 is a similar view of the device with the detachable front plate removed, Figure 3 is a vertical, longitudinal section taken centrally through the device substantially on line 3—3 of Fig. 1, with the removable front plate displaced, Figure 4 is a central transverse section, on an enlarged scale partially through Fig. 3, taken substantially on line 4—4 thereof, with the front plate fixed in position, Figure 5 is an enlarged vertical section taken on a central line 5—5 of Fig. 4, and Figure 6 is a fragmentary side view, on an enlarged scale, showing certain connections to be hereinafter referred to.

Referring now to these figures, I propose a film viewing device which may be made in various sizes, and formed of various materials suitable for the purpose, either plain or variously ornamented or embellished, depending upon the particular use to which it is to be put, since it is obviously adapted to permanent employment in the home for viewing scientific, scenic or educational films as well as a gift device for advertising purposes.

The casing of my present device includes a body portion presenting a vertically elongated rectangular open front as plainly seen in Figure 2 and including generally flat parallel side walls 10 and 11 in the spaced relation shown, and top and bottom walls 12 and 13 which converge toward one another rearwardly along curved lines to a point where they coact with the rear portions of the side walls in defining the relatively small and approximately square rear wall 14 having a lens frame 15 set therein carrying a lens 16.

Within the casing body as thus formed, a partition frame extends from one side wall to the other, this frame presenting upper and lower semi-circularly curved wings 17 and 18, connected at their inner portions by a vertical wall 19 which is positioned parallel to the front edges of the side walls 10 and 11 and spaced rearwardly therefrom a slight distance for a purpose which will presently appear. This wall 19 presents an enlarged rectangular opening in line with the lens 16, through one side of which opening, the peripheral toothed portion of a sprocket wheel 20 projects forwardly of the wall 19.

The sprocket wheel 20 which is located between the partition wings 17 and 18 is thus within the central dark view chamber 21, is mounted securely upon the inner end of a shaft 22, journalled through the side wall 10 from which the sprocket wheel 20 is spaced by a washer 23. On the outer end of shaft 22, a thumb wheel 24 is fixed and thus located externally of the casing, being preferably knurled or otherwise roughened for convenient manipulation by the operator with the lens 16 at his eye.

In addition to the view chamber 21 between them, the partition wings 17 and 18 define upper and lower roll chambers 25 and 26 for the reception of the loosely rolled ends of a film 27 shown in Figure 3 which passes, intermediate its ends vertically in front of the partition wall 19 so that its sprocket openings at one side may be engaged by the teeth of the sprocket wheel 20.

As seen particularly in Figures 3 and 4, the front edge portions of the side, top and bottom walls of the casing body, are offset inwardly and provide a snug slip fit with the flanges 28 around the edges of the rectangular detachable front wall 29 of the casing. At a central point this front wall has a window or sight opening within an inset portion 30 thereof forming a frame and adapted to receive a translucent covering 31 across its opening which may be an etched or frosted glass or celluloid section.

When the front wall 29 is in place, the frame 30 extends into close proximity to the partition wall 19 and forms therewith a film passage or throat through which the film passes closely adjacent to the window covering or glass. In this position the front portion of the toothed periphery of the sprocket wheel 20 extends into one of two depressions 32 made in the inner or rear surface of the front wall 29 preferably at both sides of the window frame 30, since the front wall is endwise reversible. These depressions result in external bosses 33 as shown and are thus situated to permit the sprocket wheel teeth to pass freely through the sprocket openings of the film moving freely through the feed throat and prevented from buckling by the cooperation of the front partition wall 19 and the window frame 30 of the casing front wall 29.

It is thus of considerable advantage to have the front wall of the casing detachable rather than a side or other wall, since the partition wall and wings may be permanently secured in the casing body and it does not matter which end of the front wall is turned uppermost when applied to the casing body. It is contemplated that the partition wall 19 and the wings 17 and 18 may be soldered to the side walls 10 and 11, or secured thereto by ears 34 outstanding from wall 19 through slots in the side walls 10 and 11 and externally bent to lock these parts together, as particularly shown in Figure 6.

Moreover, due to my improved construction, an extremely effective film feed throat is also formed, since in the association of the front wall with the casing body the inset window of the former is pressed very closely against the film as it moves between the same and the front wall of the partition.

It will be noted, furthermore, that the curvature of the outer portions of the partition wings 17 and 18 is the counterpart of that of the adjacent curved portions of the top and bottom walls 12 and 13, and that they snugly interfit such curved wall portion whereby these parts mutually contribute to their strength, durability and integrity, preserving the original outlines of the casing against blows and falls and avoiding ready deformation from other causes.

As shown most plainly in Figures 3 and 4, I also provide the inner portions of the partition wings 17 and 18 with transversal slots 35 located immediately adjacent to the wall 19 so as to expose edges at the upper and lower ends of said wall 19 to receive and hold the angularly bent ends 36 of the film 27 and in this way prevent complete passage or feed of the film into either of the film chambers.

What I claim is:—

1. A film viewing device comprising a casing having its body portion presenting an open front and a reduced rear portion terminating in a vertical rear wall, a lens and lens holder set into said rear wall, a partition frame fixed in said casing body having a central vertical portion provided with an aperture in line with the lens, and upper and lower wings of curved form coacting with and interfitting curved portions of the casing walls to define a central view chamber and upper and lower film roll chambers, a film sprocket in the forward portion of the view chamber projecting forwardly through the partition aperture, a shaft journalled through the adjacent wall of the casing to which said sprocket is fixed, a handle on the outer end of said shaft for rotating the same, and a removable front wall normally closing the front of the casing body, having a window alined with the lens and a frame for said window projecting from its inner face and opposing the apertured portion of the partition and forming, with the latter, a film feed throat therebetween adapted to hold a film closely against the window, said front wall having an inner indented portion at one side of its window frame receiving the projecting portion of the film sprocket.

2. A film viewing device comprising a casing having its body portion presenting an open front and a reduced rear portion terminating in a vertical rear wall, a lens and lens holder set into said rear wall, a partition frame fixed in said casing body having a central vertical portion provided with an aperture in line with the lens, and upper and lower wings of curved form coacting with and interfitting curved portions of the casing walls to define a central view chamber and upper and lower film roll chambers, a film sprocket in the forward portion of the view chamber projecting forwardly through the partition aperture, a shaft journalled through the adjacent wall of the casing to which said sprocket is fixed, a handle on the outer end of said shaft for rotating the same, and a removable front wall normally closing the front of the casing body, having a window alined with the lens and a frame for said window projecting from its inner face and opposing the apertured portion of the partition and forming, with the latter, a film feed throat therebetween adapted to hold a film closely against the window, said window being located centrally of the removable front wall and the latter having, at opposite sides of the window frame, indented portions to receive the forwardly projecting portion of the film sprocket, to thus allow connection of the wall with the casing body in endwise reversed positions.

3. A film viewing device comprising a casing having a hollow body including top, bottom and side walls presenting an open front and an inwardly offset edge therearound, said top and bottom walls having curved portions adjacent the open front, a lens centrally of the rear of the said body, a partition securely fastened within said body having an apertured central wall in line with the lens and upper and lower semi-circularly curved walls conforming to, and snugly interfitting the said curved portions of the top and bottom walls, to form upper and lower film roll chambers and a central film view chamber, a film sprocket in the latter chamber and rotatable from without the casing, and a front plate for said casing having a surrounding flange to engage the said offset edge of the body and also having an inwardly offset central window in line with the lens and defining, with the apertured partition wall, a film feed throat between the roll chambers which is open from one side to the other for the ready placement of a film when the front wall is detached.

4. A film viewing device comprising a casing having side walls and presenting an open front, a lens at the rear of said casing, a partition frame in said casing attached to, and forming a positive permanent connection between said side walls, said frame having a central wall apertured in line with the lens and upper and lower wings coacting with portions of the casing to form film chambers, and also having slots adjacent to said central wall to receive angularly bent ends of a film, a film moving sprocket projecting forwardly through said central wall, and a front wall engageable with the forward edges of the side walls, having a centrally located window and portions on opposite sides of said window to receive the projecting portion of the sprocket whereby the front wall may be effectively applied to the casing in endwise reversed positions.

5. In a film viewing device utilizing a film having angular engaging members at its opposite ends, a casing having a rear lens and a removable front wall having a window opposite said lens, a partition within said casing having an apertured wall between the lens and window and adjacent to said window forming a film feed throat, means for moving the film in opposite directions through said feed throat, said partition having transverse slots adjacent to the upper and lower ends of said apertured wall forming edges to receive thereagainst the engaging members of the film ends.

HAROLD B. SHAPIRO.